United States Patent Office 3,769,429
Patented Oct. 30, 1973

---

3,769,429
METHYLCYCLOPROPANES AS INHALATION ANESTHETICS
Gerald J. O'Neill, Arlington, Charles W. Simons, Bedford, and Charles A. Billings, Concord, Mass., assignors to W. R. Grace & Co., Cambridge, Mass.
No Drawing. Filed June 2, 1972, Ser. No. 259,253
Int. Cl. A61k *27/00*
U.S. Cl. 424—352                                                  1 Claim

ABSTRACT OF THE DISCLOSURE

New compounds 1 - methyl-1-trifluoromethyl-2,2-difluorocyclopropane and 1-methyl-1,2,2-trifluorocyclopropane have been found useful as general inhalation anesthetics.

THE PRIOR ART

Although a certain number of halogenated hydrocarbon compounds have joined the ranks of useful anesthetics in the recent past, little has been added to the understanding of the mode of action of chemical compounds in this physiological role, and the relationships of the differences between fairly closely similar compounds with either their toxic or therapeutic properties remain substantially unidentified. In view of this situation, the discovery of additional substances possessing a desirable combination of properties for anesthetic purposes still lies beyond the scope of routine expertise.

SUMMARY OF THE INVENTION

It has now been discovered that newly synthesized 1-methyl-1-trifluoromethyl-2,2-difluorocyclopropane and 1-methyl - 1,2,2-trifluorocyclopropane possess high potency as general anesthetics when administered to inhalation-anesthetic-susceptible organisms.

DETAILED DESCRIPTION

The two methylcyclopropanes disclosed herein for the first time are new compounds which have been found to possess anesthetic properties.

The compounds can be prepared by the reaction of a $CF_2$-carbene with an olefin according to the method of P. B. Sargent [J. Org. Chem. 35 (3), 678–82 (1970)]. The $CF_2$-carbene is obtained by thermal splitting from hexafluoropropylene oxide, a compound that can be synthesized with relative ease [J. Org. Chem. 31, 2312 (1966)]. The reactions involved may be illustrated as follows:

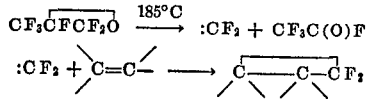

It should be noted that this method of synthesis does not always yield the compound desired possibly because in some instances, either the cyclization does not take place or, if it does, the resulting cyclo-compound is unstable at carbene generating temperatures.

Example 1

The methyltrifluoromethylcyclopropane of the invention is prepared in the following manner. 2-fluoropropene, 45 parts by weight, and hexafluoropropylene oxide, 56.9 parts, are introduced into an evacuated autoclave which has been previously cooled to −78° C. The system is heated for 6 hours at 185° C. After cooling to room temperature, the contents of the autoclave are transferred to a −196° C. trap. Substances boiling below room temperature are allowed to escape and the residue is purified by vapor phase chromatography. The product has a molecular weight of 111, a boiling point of 34° C. and a $d_4^{20}$ of 1.106 g./ml.

Example 2

2-trifluoromethylpropene, 88.8 parts by weight, and hexafluoropropylene oxide, 74.0 parts, are introduced into an evacuated autoclave previously cooled to −78° C. The system is heated at 185° C. for 5.75 hours. After cooling to room temperature, the contents of the autoclave are transferred to a −196° trap. Substances boiling below room temperature are allowed to escape and the residue is purified by vapor chromatography. The product, 1-methyl - 1,2,2 - trifluorocyclopropane, has a molecular weight of 160, a boiling point of 51° C. and a $d_4^{20}$ of 1.268 g./ml.

Example 3

The physiological effects of the two cyclopropanes prepared in the preceding examples were demonstrated as follows, using a standard test for evaluation of inhalation anesthetics similar to that described by Robbins [J. Pharmacology and Experimental Therapeutics 86, 197 (1946)].

Mice were exposed to the anesthetic for a period of 10 minutes in a rotating drum. Observations were then made of the pinch reflex, the corneal reflex and the return of the righting reflex. At least four graded doses were employed to determine the minimum concentration required to anesthetize 50% of the mice used ($AC_{50}$) and the minimum concentration required to kill 50% of the mice ($LC_{50}$). The anesthetic index (AI) was then calculated from these minimum concentrations. The results of these tests are summarized in the following table.

ANESTHETIC PROPERTIES

| Cyclopropane | Percent volume | | AI[1] |
| | $AC_{50}$ | $LC_{50}$ | ($LC_{50}/AC_{50}$) |
| --- | --- | --- | --- |
| 1-methyl-1-trifluoromethyl-2,2-difluoro.. | 5–10 | 15–20 | 1.5–2.0 |
| 1-methyl-1,2,2-trifluoro.................. | 3–7.5 | >15 | >2 |

[1] When two figures are given, the actual value of the parameter lies between these two figures.

For comparison purposes, it should be noted that 1,1,1-trifluoro-2-bromo-2-chloroethane, the commonly used "Halothane," showed an AI of 3.2 under the same test conditions. The compounds disclosed here are thus low potency anesthetics which may also be useful as analgesics.

What is claimed is:

1. The process of inducing anesthesia in a mammal which comprises administering by inhalation to said mammal an effective quantity for inducing anesthesia of a compound selected from the group consisting of 1-methyl-1-trifluoromethyl-2,2-difluorocyclopropane and 1-methyl-1,2,2-trifluorocyclopropane.

References Cited

Larsen: Fluorine Chemistry Reviews, vol. 3, 1969, pp. 1 and 35.

JEROME D. GOLDBERG, Primary Examiner